Aug. 11, 1970     R. H. SPIKES     3,523,359

METHOD OF SECURING ONE PART ABOUT ANOTHER PART

Filed Sept. 8, 1967

Inventor
Roger Hugh Spikes

By Alcock, Downing & Seebold
Attorneys

United States Patent Office 3,523,359
Patented Aug. 11, 1970

3,523,359
METHOD OF SECURING ONE PART ABOUT ANOTHER PART
Roger Hugh Spikes, Moseley, England, assignor to Joseph Lucas (Industries) Limited Birmingham, England
Filed Sept. 8, 1967, Ser. No. 666,369
Claims priority, application Great Britain, Sept. 12, 1966, 40,625/66
Int. Cl. B21d 39/00
U.S. Cl. 29—516                                   1 Claim

ABSTRACT OF THE DISCLOSURE

A method of securing one part about another part, comprising placing said one part about the other part and moving the two parts through a die so that the internal surface of the wall of the one part is urged into contact with the surface of the other part, and at the same time the thickness of the wall is reduced.

---

This invention relates to a method of securing one part about another part and has for its object to provide such a method in a simple and convenient form.

The present invention is directed to a method of securing a first part having a flanged end to one end of a second part which comprises the steps of forcing a sleeve having a flanged end over the first and second parts until the flanged ends of the first part and the sleeve are in engagement, and passing the sleeve through a die so that the internal surface of the wall of the sleeve is urged into contact with the outer surface of the parts with the wall of the sleeve being reduced in thickness thereby increasing its axial length whereby the wall of the sleeve grips the parts to secure the same together.

One example of the method in accordance with the invention will now be described with reference to the accompanying drawing in which.

Figure 1:
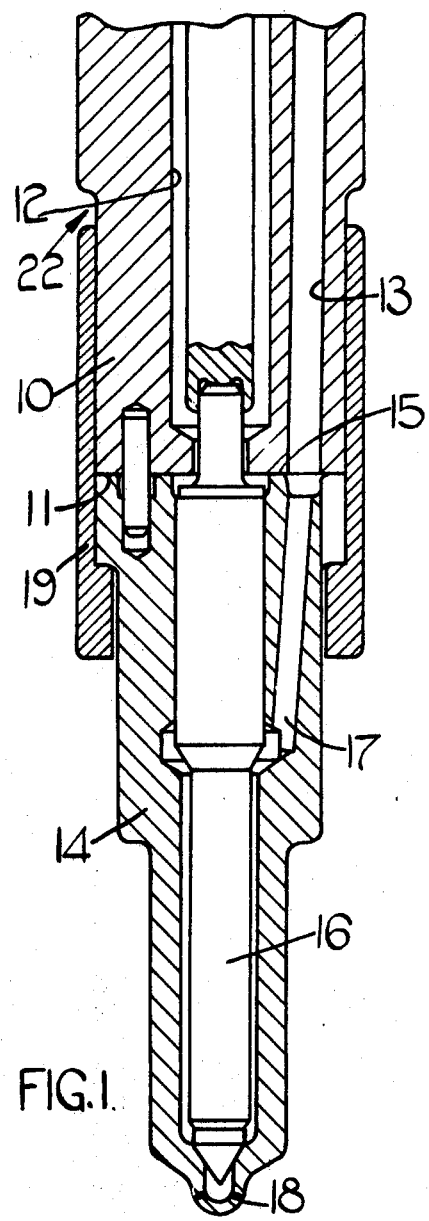
FIG. 1 is a sectional side elevation of part of a fuel injection nozzle for an internal combustion engine.

In FIG. 1 there is shown a liquid fuel nozzle unit which comprises a cylindrical body part 10 having one end machined to define a sealing surface 11 and within the body part is formed an axial bore 12 and also a fuel passage 13. Also provided is a nozzle head 14 of stepped cylindrical form and the wider end thereof is machined to define a sealing surface 15 which, when the unit is assembled, cooperates with the sealing surface 11 to define a fuel tight seal. Within the nozzle head is a valve member 16 and a further passage 17 which terminates in an orifice 18, with the valve member serving to control the flow of fuel through the orifice.

In the past it has been the practice to retain the nozzle head 14 upon the body part 10 by means of a cup shaped part 19 having an aperture in its base wall through which the narrower portion of the nozzle head extends. The internal periphery of the side wall of the cup shaped part has been provided with a screw thread for engagement with a complementary thread on the body part and by this means the two parts are retained relative to each other and the nozzle head has been retained upon and in sealing engagement with the body part.

Figure 2:
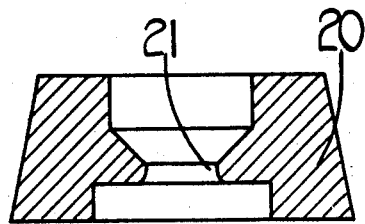
FIG. 2 is a sectional elevation of a tool used in carrying out the method in accordance with the invention.
Figure 3:
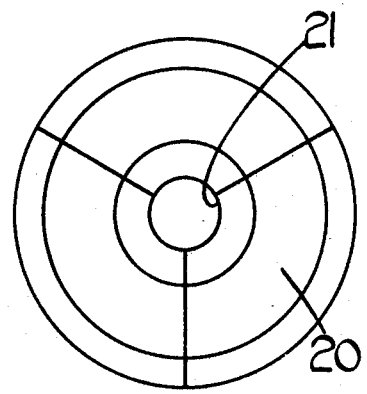
FIG. 3 is a plan view of the tool shown in FIG. 2.

The present method of retaining the two parts relative to each other is by a method of shrinking the wall of the cup shaped part 19 onto the external periphery of the body part 10. In carrying out the method, the cup shaped part is pushed onto the body part while the nozzle head 14 is held relative to the body part, and then the cup shaped part is ironed by passing it through an aperture 21 of a suitable die 20, with the direction of movement being away from the nozzle head. Such a die is shown in FIGS. 2 and 3 and the size of the aperture 21 is such that the wall of the cup shaped part is reduced in thickness and as a consequence thereof, its axial length is increased. The result is that the wall of the cup shaped part is caused to grip the body part thereby to retain the two parts together. Moreover, an axial force is developed which urges the nozzle head into fluid tight engagement with the body part.

Figure 4:
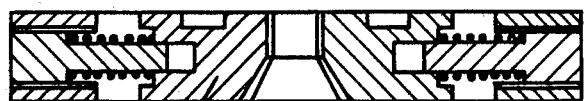
FIG. 4 is a sectional side elevation of one example of a tool which can be used to effect separation of the parts secured together by the method in accordance with the invention.

As shown, the die 20 is formed as three segmental pieces preferably from carbide and the direction of movement is away from the nozzle head. The pieces are held relative to each other during the ironing operation but are separable to allow the die to be removed after the ironing operation is finished. The cup shaped part when for instance the nozzle head is changed, is pulled off the body portion by applying a suitable axial load. To facilitate the removal an axial gap 22 is left between the end wall of the cup shaped part 19 remote from the nozzle head and any adjacent step on the body part. A tool as shown in FIG. 4, having spring loaded gripping members 23 is passed over the cup shaped part and is engaged behind the end wall.

In one example, the diameter of the body part was 0.490 inch, the internal diameter of the cup shaped part being 0.492 and 0.490 inch before and after ironing respectively, the external diameter of the part being 0.564 and 0.550 inch before and after ironing, and the axial length of the cup shaped part being 0.550 and 0.720 inch before and after ironing.

The body part 10, preferably, has a turned or otherwise roughened finish to enhance the gripping action, and may also include grooves in the suface thereof.

Having thus described my invention what I claim as new and desire to secure by Letters Patent is:

1. A method of securing a first part having a flanged end to one end of a second part, comprising the steps of forcing a sleeve having a flanged end over said first and second part until the flanged ends of the first part and sleeve in substantial engagement, and passing said sleeve through a die so that the internal surface of the wall of the sleeve is urged into contact with the outer surface of said first and second parts with the wall of the sleeve being reduced in thickness and thereby increasing its axial length so that the wall of the sleeve grips said first and second parts to secure said parts together.

References Cited

UNITED STATES PATENTS

| 1,334,051 | 3/1920 | Prime. |
| 1,141,067 | 5/1915 | Lloyd. |
| 2,046,504 | 7/1936 | Cooper. |
| 2,501,630 | 3/1950 | Goulding. |
| 2,852,843 | 9/1958 | Banta et al. _ _ _ _ _ _ 291—520 X |

FOREIGN PATENTS

| 655,741 | 1/1938 | Germany. |
| 72,272 | 5/1916 | Switzerland. |

CHARLIE T. MOON, Primary Examiner

U.S. Cl. X.R.
29—157, 520; 239—579